(12) United States Patent
Yao

(10) Patent No.: US 9,634,542 B2
(45) Date of Patent: Apr. 25, 2017

(54) ELECTRIC DEVICE FOR A BICYCLE

(71) Applicant: Li-Ho Yao, Taipei (TW)

(72) Inventor: Li-Ho Yao, Taipei (TW)

( * ) Notice: Subject to any disclaimer, the term of this patent is extended or adjusted under 35 U.S.C. 154(b) by 643 days.

(21) Appl. No.: 14/149,902

(22) Filed: Jan. 8, 2014

(65) Prior Publication Data

US 2014/0210318 A1    Jul. 31, 2014

(30) Foreign Application Priority Data

Jan. 25, 2013  (TW) .............................. 102102840 A

(51) Int. Cl.
| | |
|---|---|
| *H02K 1/14* | (2006.01) |
| *H02K 7/14* | (2006.01) |
| *B62M 6/50* | (2010.01) |
| *B62M 6/55* | (2010.01) |

(52) U.S. Cl.
CPC ................ *H02K 7/14* (2013.01); *B62M 6/50* (2013.01); *B62M 6/55* (2013.01)

(58) Field of Classification Search
CPC .............. H02K 7/14; B62M 6/50; B62M 6/55
See application file for complete search history.

(56) References Cited

U.S. PATENT DOCUMENTS

| | | | |
|---|---|---|---|
| 5,728,017 A | 3/1998 | Bellio et al. | |
| 5,895,333 A | 4/1999 | Morisawa et al. | |
| 6,031,306 A * | 2/2000 | Permuy .................. | H02K 11/33 310/60 A |
| 6,163,148 A | 12/2000 | Takada et al. | |
| 6,296,072 B1 * | 10/2001 | Turner ..................... | B62M 6/55 180/206.2 |
| 6,344,008 B1 | 2/2002 | Nagano et al. | |
| 6,580,188 B2 * | 6/2003 | Endo ................... | B60L 11/1801 180/65.26 |
| 7,626,395 B2 | 12/2009 | Kanamori | |
| 7,959,534 B2 | 6/2011 | Kasuga et al. | |
| 8,088,034 B2 | 1/2012 | Imamura et al. | |
| 8,131,413 B2 | 3/2012 | Yuan | |

(Continued)

FOREIGN PATENT DOCUMENTS

| | | |
|---|---|---|
| CN | 1293139 A | 5/2001 |
| CN | 101208217 A | 6/2008 |

(Continued)

OTHER PUBLICATIONS

US 6,872,160, 03/2005, Hata et al. (withdrawn)
European Patent Office, Extended European Search Report on European Patent Appln. No. EP 14150796.2, May 8, 2014, 7 pages.

*Primary Examiner* — Dang Le
(74) *Attorney, Agent, or Firm* — Alan D. Kamrath; Kamrath IP Lawfirm, P.A.

(57) ABSTRACT

An electric device for a bicycle has a casing, a pedal shaft, a motor shaft, a rotor assembly, a stator assembly, a gear assembly, a chain wheel and a control unit. Because a normal of the circuit board of the control unit is parallel to the motor shaft, the circuit board can be axially adjacent to a side surface of the rotor assembly to detect the rotor assembly. Thus, one single circuit board can detect the rotor assembly as well as maintain electric connection with other components, thereby saving space and reducing the volume of the casing. As the casing has a reduced volume, interference with the rear wheel can be avoided.

20 Claims, 11 Drawing Sheets

(56) References Cited

U.S. PATENT DOCUMENTS

| | | | |
|---|---|---|---|
| 8,142,317 B2 | 3/2012 | Nagamatsu | |
| 8,152,670 B2 | 4/2012 | Kuzuya et al. | |
| 8,646,560 B2 | 2/2014 | Chan | |
| 8,651,993 B1* | 2/2014 | Watarai | B62M 6/55 475/205 |
| 8,981,588 B2 | 3/2015 | Saida et al. | |
| 2002/0079755 A1* | 6/2002 | Sunaga | H02K 11/33 310/67 R |
| 2010/0138086 A1 | 6/2010 | Imamura et al. | |
| 2011/0180341 A1 | 7/2011 | Chan | |
| 2011/0183805 A1* | 7/2011 | Chan | B62M 6/50 475/254 |
| 2012/0239237 A1 | 9/2012 | Hashimoto | |
| 2012/0329594 A1 | 12/2012 | Sada et al. | |
| 2013/0008284 A1 | 1/2013 | Sada et al. | |

FOREIGN PATENT DOCUMENTS

| | | |
|---|---|---|
| CN | 201509119 U | 6/2010 |
| EP | 2371697 A1 | 10/2011 |
| GB | 2312403 A | 10/1997 |
| JP | H10185715 A | 7/1998 |
| JP | H115584 A | 1/1999 |
| JP | 2001213381 A | 8/2001 |
| JP | 2002139136 A | 5/2002 |
| JP | 2002302088 A | 10/2002 |
| JP | 2003104277 A | 4/2003 |
| JP | 2003163476 A | 6/2003 |
| JP | 4124411 B2 | 7/2008 |
| JP | 2009137365 A | 6/2009 |
| JP | 2010241307 A | 10/2010 |
| JP | 2010274788 A | 12/2010 |
| JP | 2010280315 A | 12/2010 |
| JP | 2011147296 A | 7/2011 |
| JP | 2011207362 A | 10/2011 |
| JP | 2011230713 A | 11/2011 |
| JP | 2012030679 A | 2/2012 |
| JP | 2012201134 A | 10/2012 |
| TW | 370067 | 9/1999 |
| TW | M300644 U | 11/2006 |
| TW | M395636 U | 1/2011 |
| WO | WO2012127674A1 A1 | 9/2012 |
| WO | WO2012137329A1 A2 | 10/2012 |

* cited by examiner

ELECTRIC DEVICE FOR A BICYCLE

CROSS-REFERENCE TO RELATED APPLICATIONS

This application is based upon and claims priority under 35 U.S.C. 119 from Taiwan Patent Application No. 102102840 filed on Jan. 25, 2013, which is hereby specifically incorporated herein by this reference thereto.

BACKGROUND OF THE INVENTION

1. Field of the Invention

The present invention relates to an electric device for a bicycle and, especially, to an electric device with reduced volume.

2. Description of the Prior Arts

A bicycle is a very common vehicle that is driven only by manpower. To save strength and decrease burden of a biker, some bicycles are installed with an electric propulsion device, and said bicycles are so-called electric bicycles or electric assist bicycles.

The conventional electric propulsion device has a motor, a sensor and a control unit. The motor is mounted nearby a pedal shaft of a bicycle and has a casing, a rotor assembly and a stator assembly. Two ends of the pedal shaft protrude out of the casing. The rotor assembly is mounted securely on the pedal shaft. The stator assembly is mounted securely in the casing. When the stator assembly is electrified, the stator assembly generates a magnetic field, which rotates the rotor assembly with the pedal shaft. The pedal shaft rotates a chain wheel and a rear wheel of the bicycle to move the bicycle. The sensor measures a rotation rate and torque of the pedal shaft. The control unit is mounted in the casing and has a main circuit board and a rotor detecting circuit board. The main circuit board is electrically connected to the sensor and the stator assembly. The rotor detecting circuit board is electrically connected to the main circuit board. A normal of the rotor detecting circuit board is parallel to an axis of the rotor assembly, and the rotor detecting circuit board is adjacent to the rotor assembly. A magnetic loop is mounted axially on the rotor assembly. The magnetic loop is magnetized to have multiple S magnetic poles and multiple N magnetic poles. The S magnetic poles and the N magnetic poles are annularly staggered, and magnetic fields of the S magnetic poles and the N magnetic poles extend axially. The rotor detecting circuit board detects one magnetic pole among the S magnetic poles and the N magnetic poles. The magnetic field of the stator assembly is changed depending on whether the rotor detecting circuit board detects the S magnetic pole or the N magnetic pole such that the rotor assembly actuates the pedal shaft.

When a biker pedals to rotate the pedal shaft, the sensor measures the rotation rate and the torque of the pedal shaft and then transmits the rotation rate and the torque to the main circuit board. Then, the main circuit board changes the rotation rate of the rotor assembly to match the rotation rate of the pedal shaft in order to integrate a force generated by the motor and a force generated by the biker to decrease the resistance force that the biker encounters.

However, the conventional electric propulsion device has the following shortcomings.

First, the main circuit board and the rotor detecting circuit board of the control unit are mounted in different positions and thus must be connected with each other by flat cables. Then, the casing of the motor must be big enough to accommodate the flat cables. Furthermore, the big casing may interfere with the installation of a bicycle frame. If the casing extends backward too much, the casing even interferes with the rear wheel, such that the bicycle frame must be prolonged or the motor must be minimized in outer diameter. However, minimized outer diameters of the rotor assembly and the stator assembly also lower the output power of the motor.

Second, the main circuit board of the control unit has multiple power switch devices vertically mounted on a surface of the main circuit board. Because the power switch devices are erected upright on the main circuit board, the casing of the motor must be big enough to accommodate the power switch devices, which causes the same shortcoming.

Third, the control unit further has multiple heatsinks to dissipate heat of the power switch device. Each conventional heatsink has an outside part and an inside part. The outside part is installed outside the casing. The inside part protrudes inside the casing to contact the power switch devices. Because the heatsink is an individual component installed on the casing by some other components such as screws, the overall volume of the motor is therefore enlarged. On the other hand, to accommodate the inside part, the casing must be big enough as well. As a result, the conventional heatsink also has the same shortcoming of a large volume.

Further, a bicycle with the electric propulsion device is usually installed with a display unit and various kinds of peripheral devices, such as a power start device, a power adjustment device, power-off brakes and a switch grip shift. The display unit is connected to the peripheral devices to display the information of the peripheral devices, or the biker can control the peripheral devices by operating the display unit.

However, the conventional display unit is connected to the peripheral devices and the main circuit board by analog cables. Each peripheral device is first connected to the display unit by an analog cable, and, then, the display unit is connected to the main circuit board by another analog cable. In addition, the display unit itself is also connected to the main circuit board by another analog cable, and the multiple cables are often disorganized and in disorder. For example, if the bicycle has four peripheral devices, the four peripheral devices are connected to the display units via four analog cables, and the display unit is connected to the main circuit board via five analog cables. As a result, there are nine cables in total, which easily cause disorder of the cables and inconvenience in maintenance.

To overcome the shortcomings, the present invention provides an electric device for a bicycle to mitigate or obviate the aforementioned problems.

SUMMARY OF THE INVENTION

The main objective of the present invention is to provide an electric device for a bicycle with reduced volume.

The electric device for a bicycle has a casing, a pedal shaft, a motor shaft, a rotor assembly, a stator assembly, a gear assembly, a chain wheel and a control unit. The pedal shaft is mounted through the casing. The motor shaft is mounted pivotally in the casing. The rotor assembly is mounted in the casing, is connected to the motor shaft and actuates the motor shaft. The stator assembly is mounted securely in the casing and corresponds to the rotor assembly. The gear assembly is mounted in the casing, is connected to the pedal shaft and the motor shaft, and is actuated by the pedal shaft or the motor shaft. The chain wheel is connected to the gear assembly and is actuated by the gear assembly. The control unit is mounted securely in the casing and has a circuit board and multiple power switch devices. The circuit board is electrically connected to the stator assembly and has a rotor detecting segment. The rotor detecting segment is adjacent to the rotor assembly and detects the rotor assembly. A normal of the circuit board is parallel to the motor shaft. The power switch devices are electrically connected to the circuit board.

Because the normal of the circuit board is parallel to the motor shaft, the circuit board can be axially adjacent to a side surface of the rotor assembly to detect the rotor assembly. Thus, one single circuit board of the present invention can integrate and replace the conventional main circuit board and the rotor detecting circuit board. Therefore, the control unit does not need the cables connected between the conventional main circuit board and the rotor detecting circuit board, thereby saving space and reducing the volume of the casing. As the casing has a reduced volume, interference with the rear wheel can be avoided.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
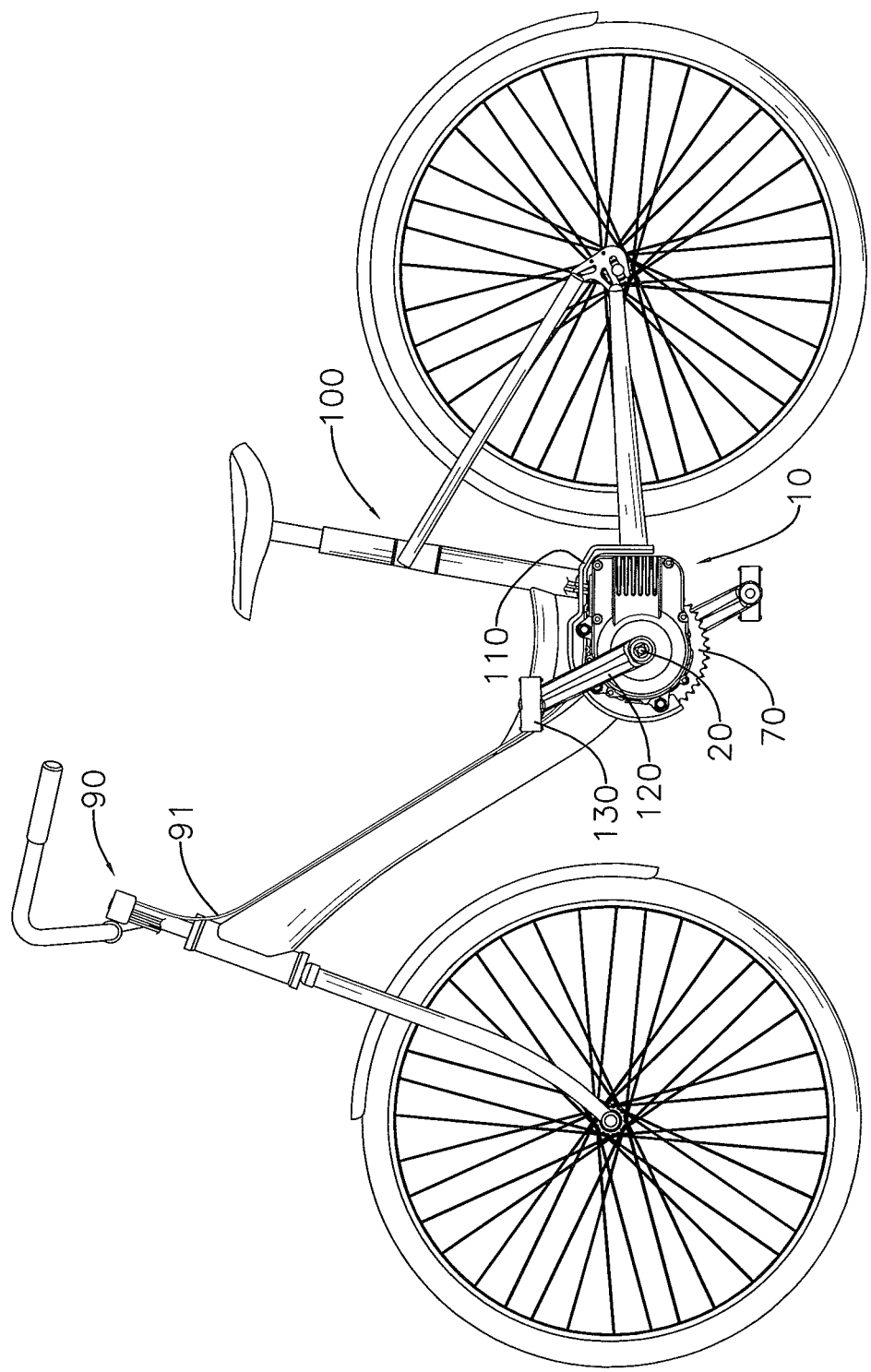
FIG. 1 is an operational side view of an electric device for a bicycle in accordance with the present invention, showing the electric device mounted on a bicycle frame.

With reference to FIGS. 1 to 5, an electric device for a bicycle in accordance with the present invention comprises a propulsion device. In a preferred embodiment, the electric device further comprises a display unit 90. The propulsion device comprises a casing 10, a pedal shaft 20, a motor shaft 40, a rotor assembly 51, a stator assembly 52, a gear assembly 60, a chain wheel 70 and a control unit 80. In a preferred embodiment, the propulsion device further comprises a receiver 31 and a sensor 32.

Figure 6:
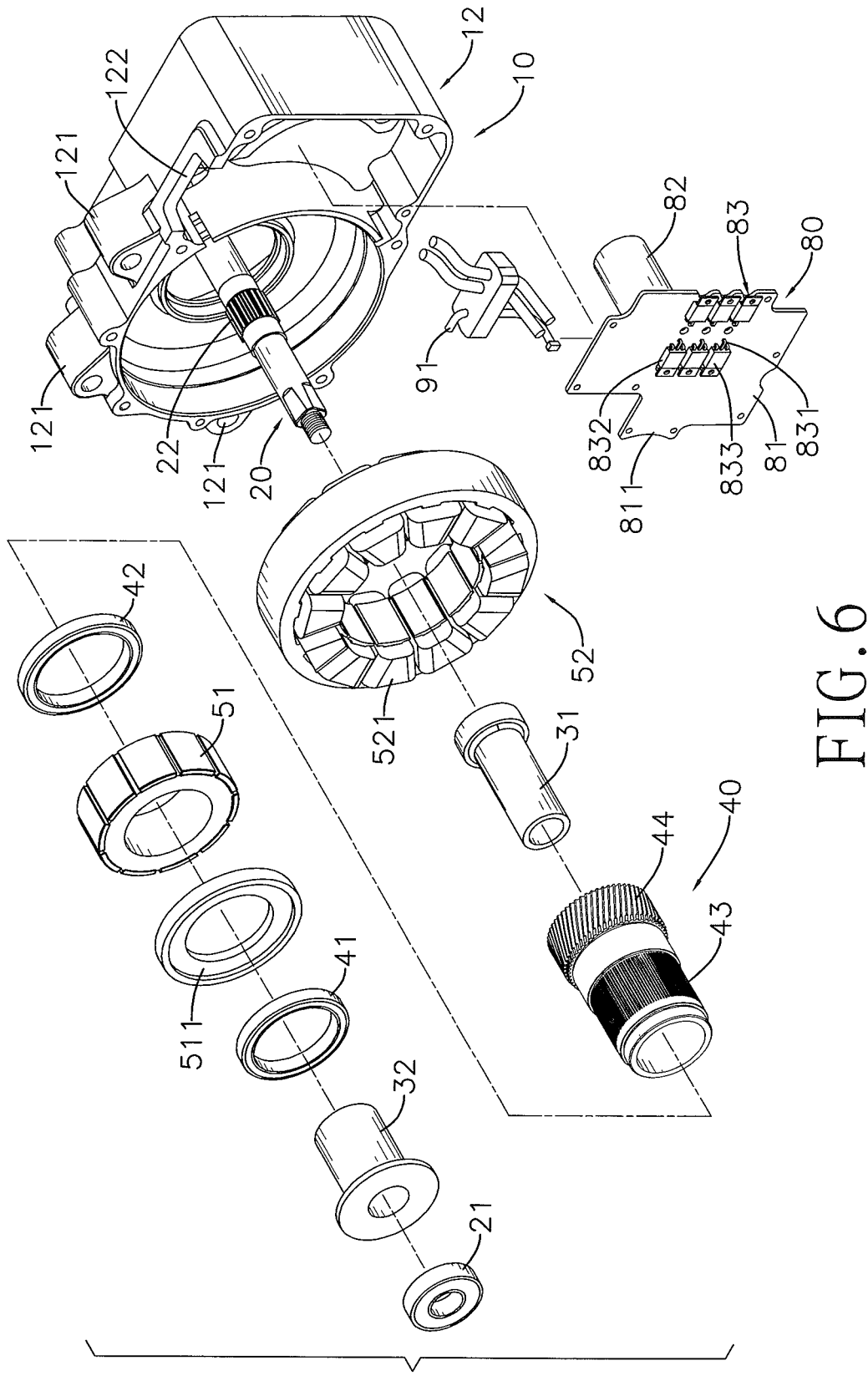
FIG. 6 is a partial exploded perspective view of the propulsion device of the electric device in FIG. 1.

With reference to FIGS. 2 to 4 and 6, the casing 10 has an inner space. In a preferred embodiment, the casing 10 has a left casing 11, a middle casing 12 and a right casing 13. The left casing 11 and the right casing 13 are respectively mounted on two sides of the middle casing 12. The inner space of the casing 10 is formed between the left casing 11, the middle casing 12 and the right casing 13. The casing 10 has multiple heat-dissipating fins 111 formed on an outside surface of the left casing 11. The casing 10 has three frame connectors 121 formed on an outside surface of the middle casing 12. The frame connectors 121 are formed with intervals between the frame connectors 121 from top to front of the middle casing 12 as shown in FIG. 6. The casing 10 has a cable hole 122 formed through tops of the left casing 11 and the middle casing 12.

Figure 5:
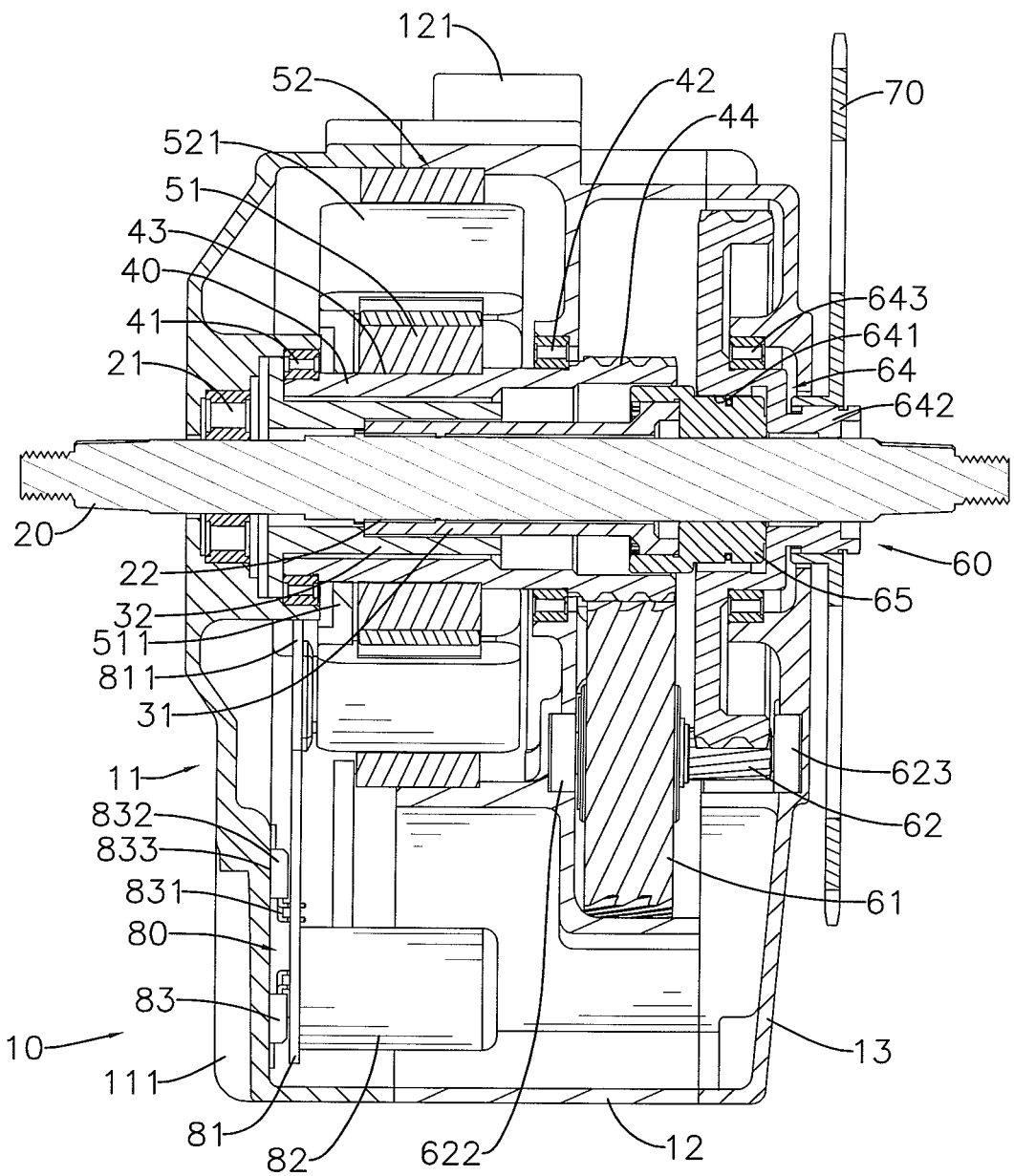
FIG. 5 is a top view in partial section of the propulsion device of the electric device in FIG. 1.
Figure 7:
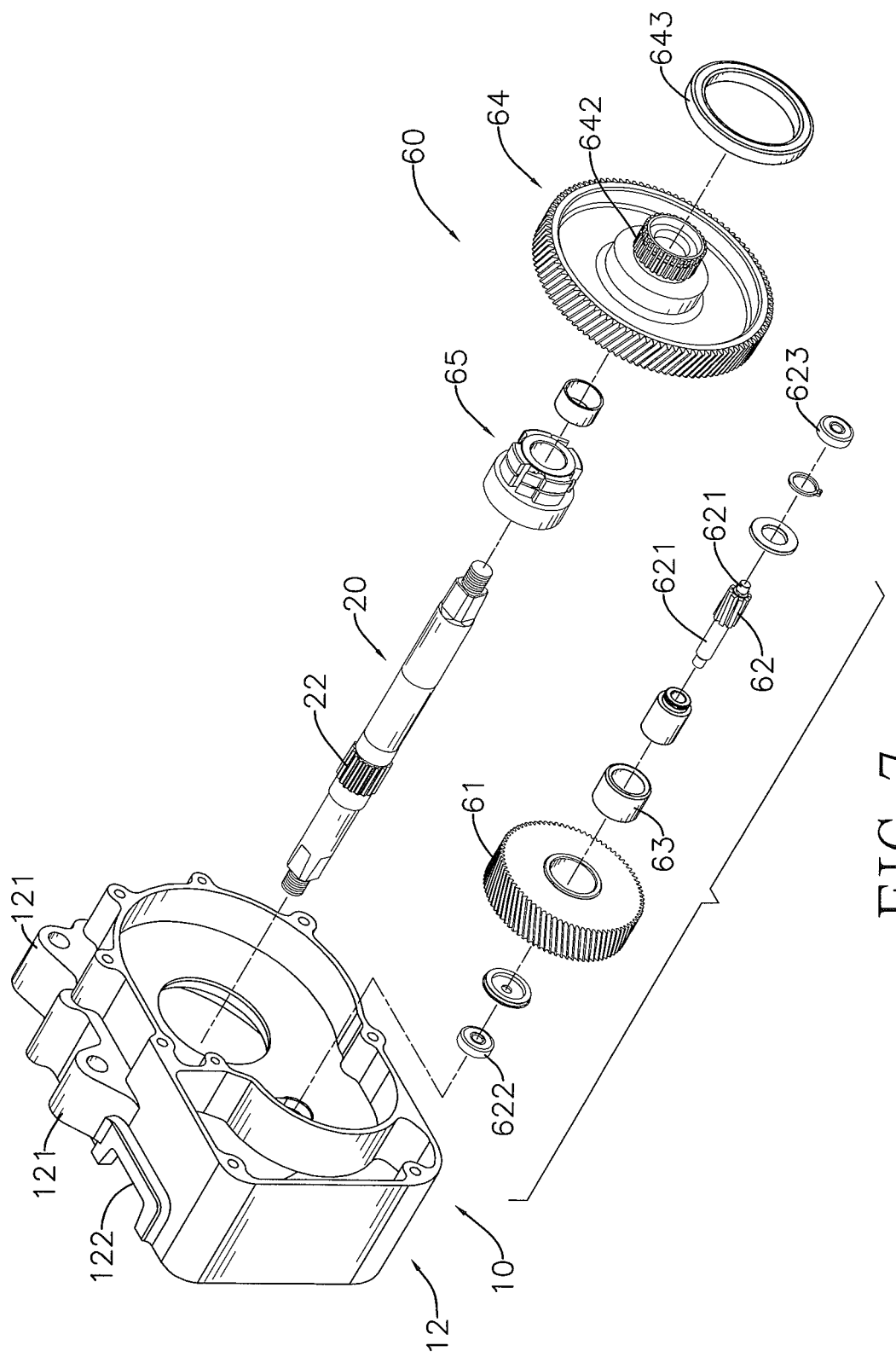
FIG. 7 is another partial exploded perspective view of the propulsion device of the electric device in FIG. 1.
Figure 8:
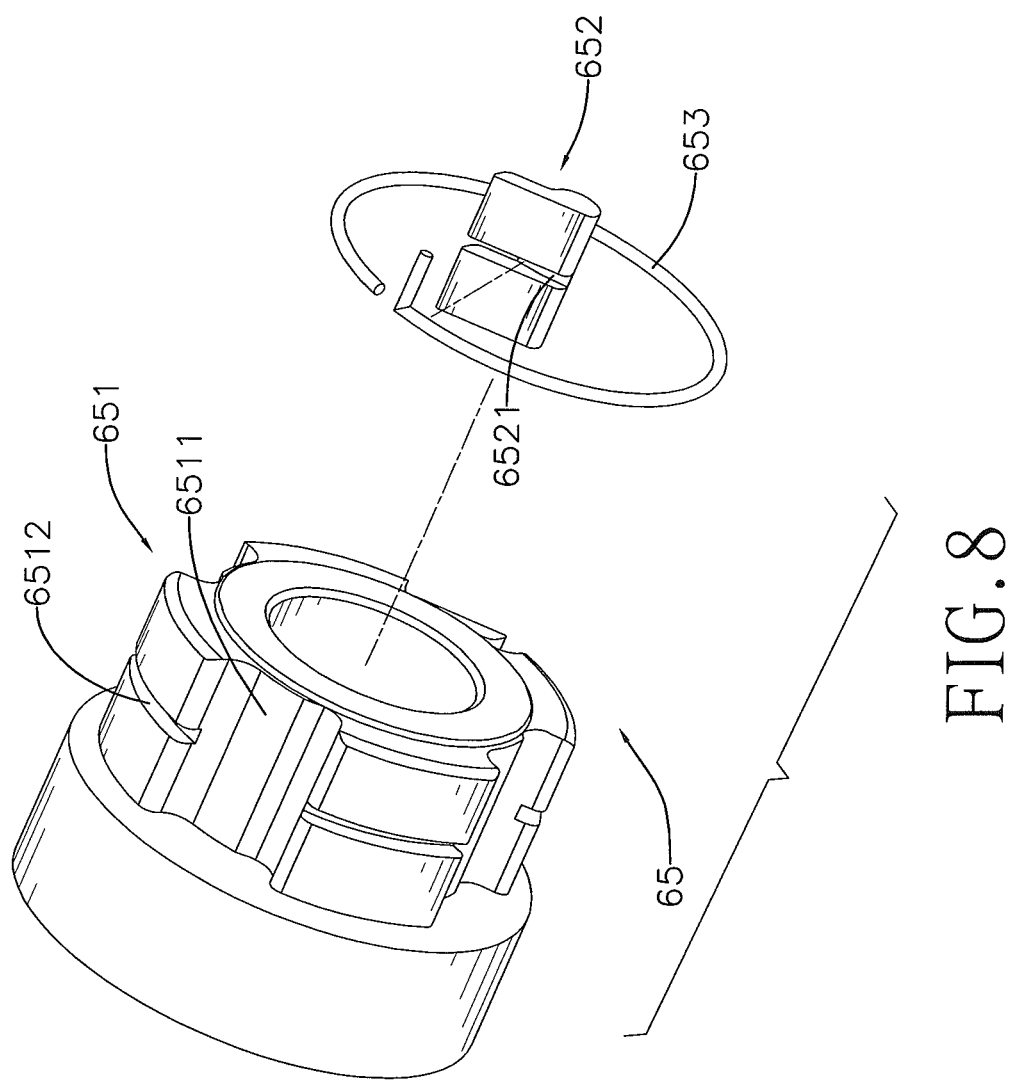
FIG. 8 is an exploded perspective view of a one-way pedal clutch of the electric device in FIG. 1.
Figure 9:
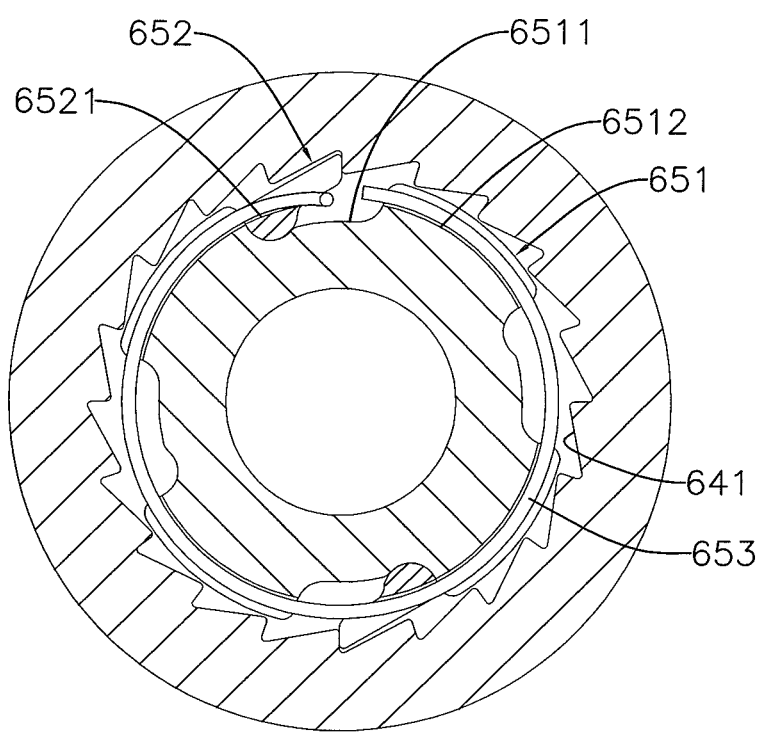
FIG. 9 is a side view in partial section of the one-way pedal clutch of the electric device in FIG. 1.

With reference to FIGS. 5 to 7, the pedal shaft 20 is mounted through the casing 10 and has two ends protruding out of the casing 10. In a preferred embodiment, two ends of the pedal shaft 20 each respectively protrude out of the right casing 13 and the left casing 11. The pedal shaft 20 has multiple splines 22 formed annularly on an outside surface of the pedal shaft 20. A bearing 21 is mounted between the pedal shaft 20 and the left casing 11.

Figure 3:
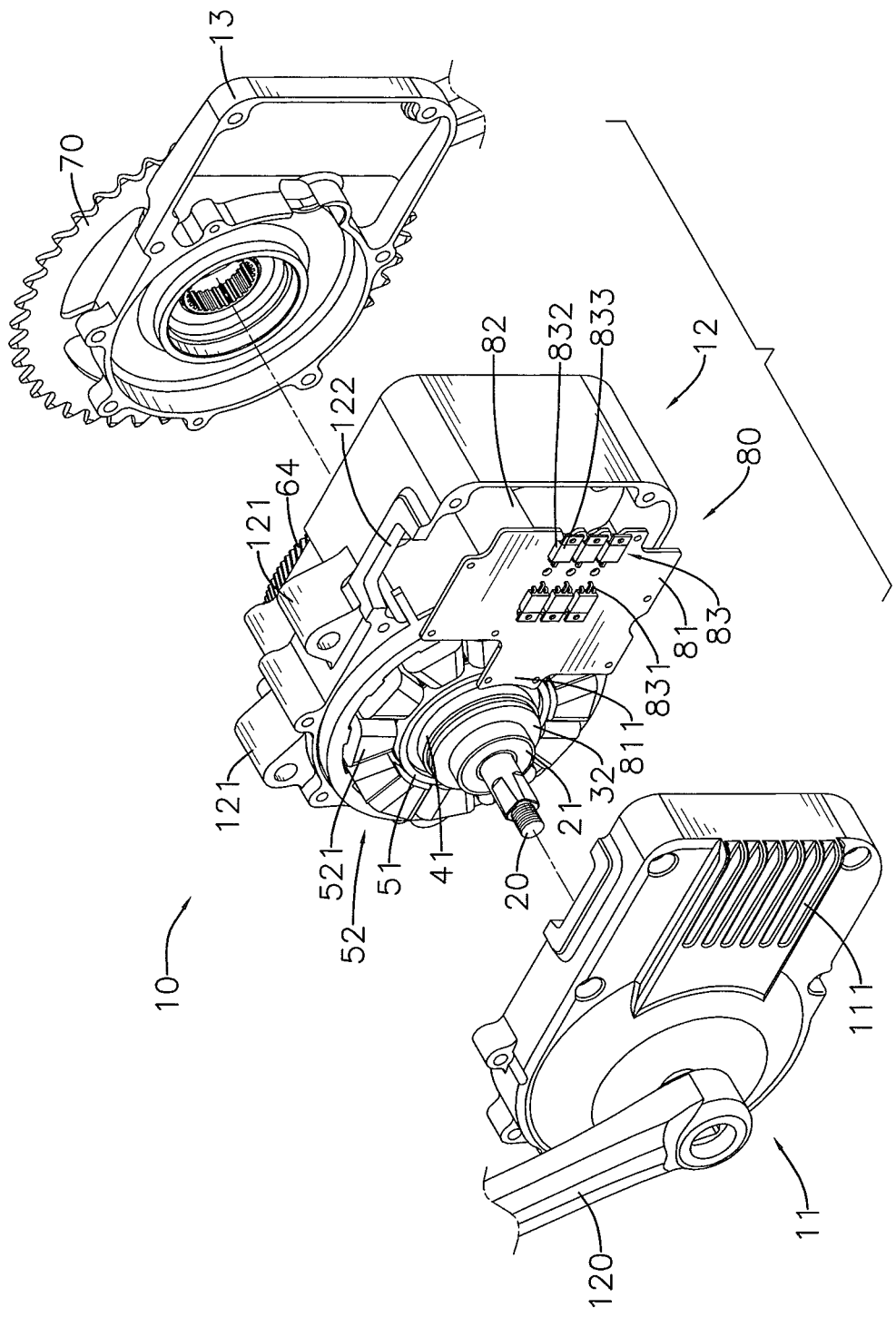
FIG. 3 is an exploded perspective view of the propulsion device of the electric device in FIG. 1.

With reference to FIGS. 3, 5 and 6, the receiver 31 is mounted in the casing 10 and is mounted between the middle casing 12 and the left casing 11. In a preferred embodiment, the receiver 31 is a sleeve and is mounted around the pedal shaft 20. The receiver 31 has multiple splines formed annularly on an inside surface of the receiver 31. The splines of the receiver 31 engage with the splines 22 of the pedal shaft 20 such that the receiver 31 is actuated by the pedal shaft 20.

The sensor 32 is mounted in the casing and is mounted securely to the left casing 11. The sensor 32 is mounted around the pedal shaft 20 and the receiver 31.

The motor shaft 40 is mounted pivotally in the casing 10. In a preferred embodiment, the motor shaft 40 is mounted between the middle casing 12 and the left casing 11. A bearing 41 is mounted between a left end of the motor shaft 40 and the left casing 11. A right end of the motor shaft 40 is mounted through the middle casing 12. Another bearing 42 is mounted between the motor shaft 40 and the middle casing 12. The motor shaft 40 is mounted around the pedal shaft 20 and the sensor 32. The motor shaft 40 has multiple textures 43 and a gear 44. The textures 43 are formed annularly on an outside surface of the motor shaft 40 and are formed from the middle to the left end of the motor shaft 40. The gear 44 is formed annularly on the outside surface of the motor shaft 40 and is on the right end of the motor shaft 40.

The rotor assembly 51 is mounted in the casing 10, is connected to the motor shaft 40, and actuates the motor shaft 40. In a preferred embodiment, the rotor assembly 51 is mounted between the middle casing 12 and the left casing 11. The rotor assembly 51 is mounted securely around the motor shaft 40. The rotor assembly 51 is mounted tightly around the textures 43 of the motor shaft 40 such that the motor shaft 40 is actuated by the rotor assembly 51. The rotor assembly 51 has a magnetic loop 511 mounted on a left surface of the rotor assembly 51. The magnetic loop 511 is magnetized to have multiple S magnetic poles and multiple N magnetic poles. The S magnetic poles and the N magnetic poles are annularly staggered, and magnetic fields of the S magnetic poles and the N magnetic poles extend axially.

The stator assembly 52 is mounted securely in the casing 10 and corresponds to the rotor assembly 51. In a preferred embodiment, the stator assembly 52 is mounted between the middle casing 12 and the left casing 11, and the stator assembly 52 is mounted around the rotor assembly 51. The stator assembly 52 has multiple reels of copper wire 521. The stator assembly 52, the rotor assembly 51 and the motor shaft 40 constitute a motor.

Figure 4:
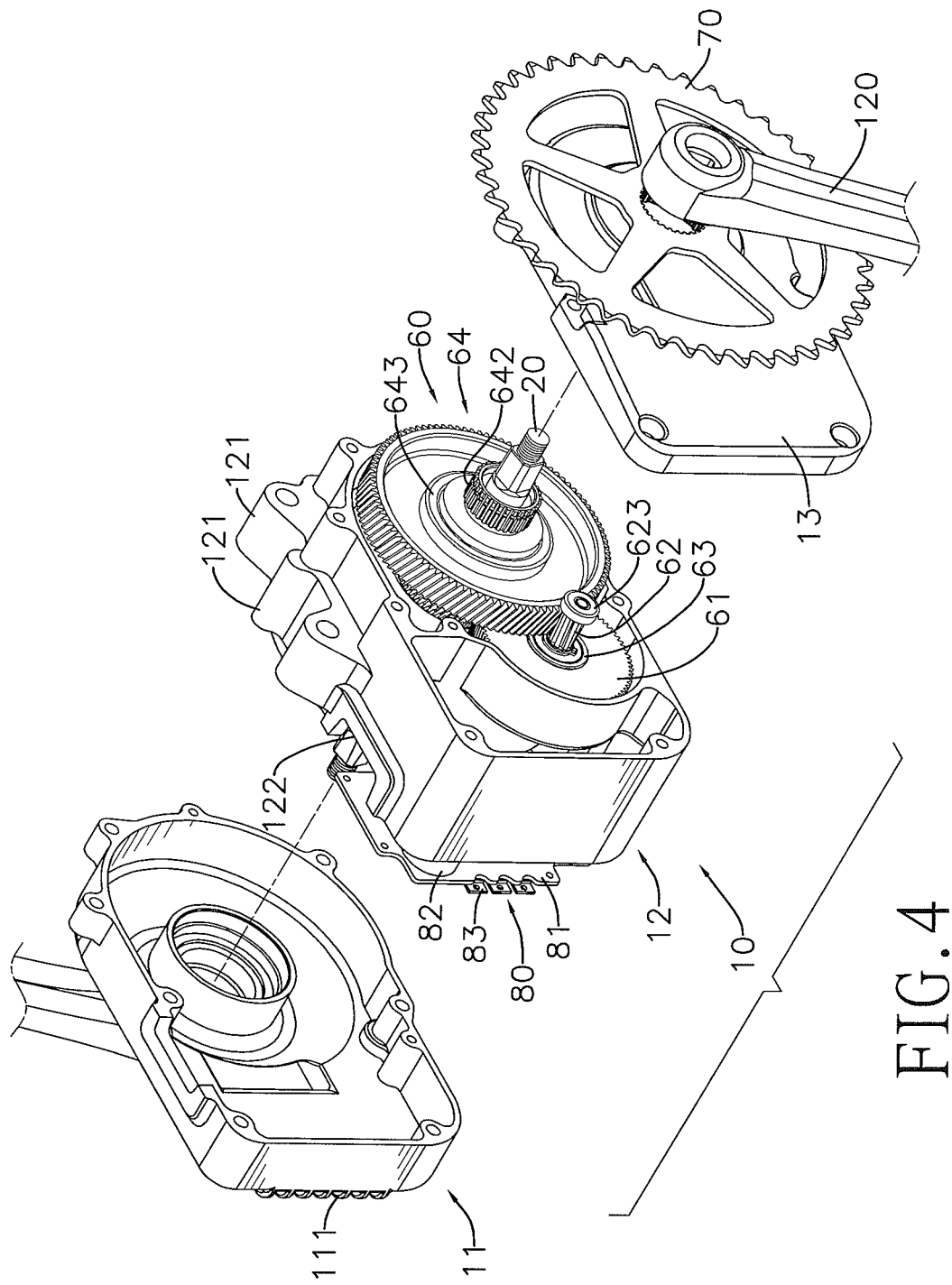
FIG. 4 is another exploded perspective view of the propulsion device of the electric device in FIG. 1.

With reference to FIGS. 4, 5 and 7, the gear assembly 60 is mounted in the casing 10, is connected to the pedal shaft 20 and the motor shaft 40, and is actuated by the pedal shaft 20 or the motor shaft 40. In a preferred embodiment, the gear assembly 60 is mounted between the middle casing 12 and the right casing 13. The gear assembly 60 includes a middle gear 61, a small gear 62, a one-way motor clutch 63, a big gear 64 and a one-way pedal clutch 65.

The middle gear 61 is mounted pivotally in the middle casing 12 and is in back of the pedal shaft 20. The middle gear 61 engages with the gear 44 of the motor shaft 40.

The small gear 62 has two rods 621 respectively formed on two opposite surfaces of the small gear 62. The left rod 621 is mounted through a center of the middle gear 61. Each rod 621 has a bearing 622, 623 mounted on an end of the rod 621, and the two bearings 622, 623 are each respectively mounted through the middle casing 12 and the right casing 13.

The one-way motor clutch 63 is mounted between the middle gear 61 and the rod 621 of the small gear 62, such that the small gear 62 is actuated by the middle gear 61, but the middle gear 61 is not actuated by the small gear 62. In a preferred embodiment, the one-way motor clutch 63 is a one-way bearing.

The big gear 64 is mounted around the pedal shaft 20 and engages with the small gear 62. The big gear 64 has a gear recess 641 formed in a center of a left surface of the big gear 64. The big gear 64 has a gear segment 642 protruding from a center of a right surface of the big gear 64. A bearing 643 is mounted between the big gear 64 and the right casing 13.

The one-way pedal clutch 65 is mounted between the pedal shaft 20 and the big gear 64 and is mounted in the gear recess 641 of the big gear 64, such that the big gear 64 is actuated by the pedal shaft 20, but the pedal shaft 20 is not actuated by the big gear 64.

With reference to FIGS. 5, 7 to 9, in a preferred embodiment, the one-way pedal clutch 65 is a ratchet and has a ratchet body 651, multiple abutters 652 and an elastic ring 653.

A left side of the ratchet body 651 is mounted tightly around a right side of the receiver 31 such that the pedal shaft 20 actuates the ratchet body 651 via the receiver 31. The ratchet body 651 has multiple abutter recesses 6511 annularly arranged at intervals on an outside surface of the ratchet body 651. The ratchet body 651 has a ring recess 6512 formed annularly in the outside surface of the ratchet body 651.

Each abutter 652 is mounted in the corresponding abutter recess 6511 of the ratchet body 651. Each abutter 652 has a ring recess 6521 formed in a center of the abutter 652.

The elastic ring 653 is mounted around the ring recess 6512 of the ratchet body 651 and abuts bottoms of the ring recesses 6521 of the abutters 652. Each abutter 652 is pushed by the elastic ring 653 and is tilted to abut a corresponding tooth face of the gear recess 641 of the big gear 64. When the one-way pedal clutch 65 rotates with the abutter 652 abutting the tooth face of the gear recess 641, the abutter 652 rotates the gear recess 641 and the big gear 64. However, when the one-way pedal clutch 65 rotates in the reverse direction, the abutter 652 is pushed by an inclined surface of the gear recess 641 and slightly braces the elastic ring 653. At this time, the abutter 652 does not abut the tooth face of the gear recess 641 and does not rotate the big gear 64, either. Accordingly, the one-way pedal clutch 65 achieves one-way actuation.

Because the pedal shaft 20 is under relatively high torque at a relatively low rotation rate, the ratchet is more appropriate for the one-way pedal clutch 65. On the other hand, the middle gear 61 is under relatively low torque at a relatively high rotation rate, so the one-way bearing is more appropriate for the one-way motor clutch 63.

Because the small gear 62 has fewer teeth than the middle gear 61, and the middle gear 61 has fewer teeth than the big gear 64, the motor shaft 40 can achieve reduction of the rotation rate and increase of torque.

With reference to FIGS. 4, 5 and 7, the chain wheel 70 is connected to the gear assembly 60 and is actuated by the gear assembly 60. In a preferred embodiment, the chain wheel 70 is on an outside of the right casing 13. The chain wheel 70 is mounted around the gear segment 642 of the big gear 64 of the gear assembly 60, and engages with the gear segment 642 such that the chain wheel 70 and the big gear 64 are actuated by each other.

With reference to FIGS. 3, 5 and 6, the control unit 80 is mounted securely in the casing 10 and has a circuit board 81 and multiple power switch devices 83. A normal of the circuit board 81 is parallel to the motor shaft 40. The circuit board 81 is electrically connected to the stator assembly 52 and has a rotor detecting segment 811. The rotor detecting segment 811 is adjacent to the rotor assembly 51 and detects the rotor assembly 51. The power switch devices 83 are electrically connected to the circuit board 81. In a preferred embodiment, the control unit 80 is mounted between the middle casing 12 and the left casing 11. The circuit board 81 is mounted in back of the pedal shaft 20. A left surface of the circuit board 81 is adjacent to the left casing 11, and the circuit board 81 is mounted securely to the left casing 11 by screws. The circuit board 81 is electrically connected to the sensor 32. The rotor detecting segment 811 is formed on a front side of the circuit board 81, and is adjacent to a left surface of the magnetic loop 511 of the rotor assembly 51 such that the rotor detecting segment 811 detects the magnetic fields extending axially from the S magnetic pole or the N magnetic pole. The control unit 80 further has a capacitor 82 mounted on a right surface of the circuit board 81. The capacitor 82 is mounted between the circuit board 81 and the middle gear 61 of the gear assembly 60. The circuit board 81, the capacitor 82, the middle gear 61 and the small gear 62 are all on the same side of the pedal shaft 20 to be closely disposed, and the casing 10 can be reduced in volume to accommodate the closely disposed components. The power switch devices 83 are mounted on the left surface of the circuit board 81. Each power switch device 83 has a switch body 832 and multiple pins 831. The pins 831 are connected to the switch body 832 and the circuit board 81. Each pin 831 is bent vertically such that the switch body 832 is parallel to the circuit board 81. Each switch body 832 has a metal heat-dissipating surface 833. The metal heat-dissipating surface 833 faces toward a direction away from the circuit board 81, and abuts an inside surface of the left casing 11. The power switch devices 83 are disposed in an inside of the corresponding heat-dissipating fin 111. The power switch device 83 is preferably, but not limited to, a Metal-Oxide-Semiconductor Field-Effect Transistor (MOSFET).

With reference to FIGS. 1, 6, 10 and 11, the display unit 90 has an analog-to-digital converter 93 and a digital cable 91. One end of the digital cable 91 is connected to the analog-to-digital converter 93. The other end of the digital cable 91 is mounted through the cable hole 122 of the casing 10 and is electrically connected to the right surface of the circuit board 81.

Figure 2:
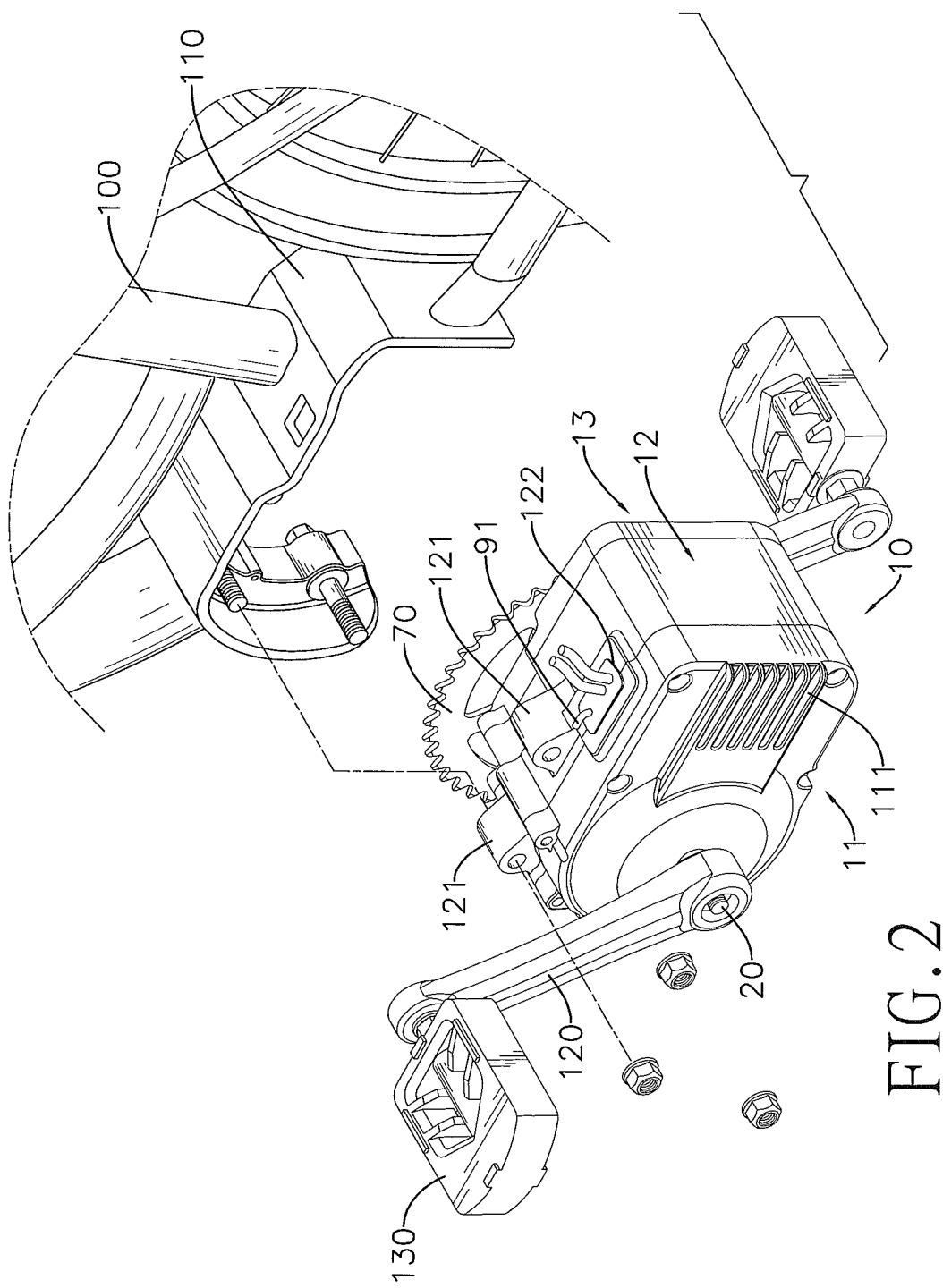
FIG. 2 is a perspective view of a propulsion device of the electric device in FIG. 1.

With reference to FIGS. 1, 2 and 6, when the electric device as described is in use, the casing 10 of the propulsion device is mounted on a bicycle frame 100. The three frame connectors 121 of the middle casing 12 are mounted securely to a connecting segment 110 of the bicycle frame 100 by screws. Two cranks 120 are respectively mounted on two sides of the pedal shaft 20, and a roller chain surrounds the chain wheel 70.

Figure 10:
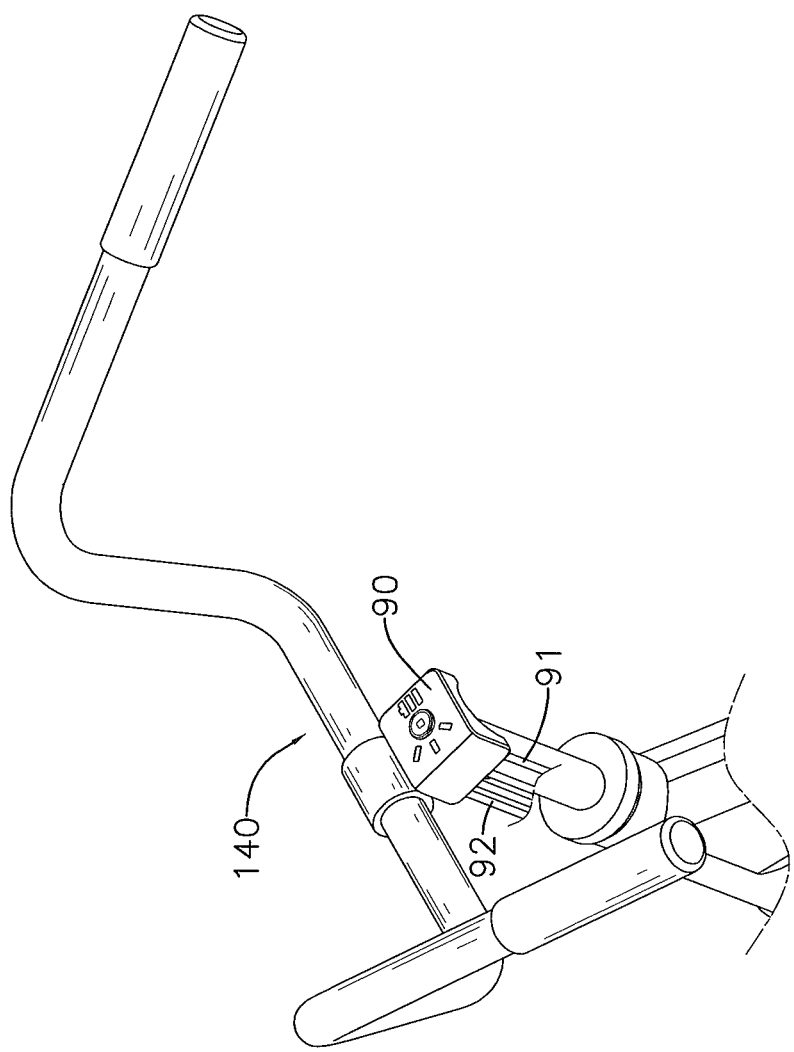
FIG. 10 is an operational perspective view of a display unit of the electric device in FIG. 1, showing the display unit mounted on the bicycle frame.
Figure 11:
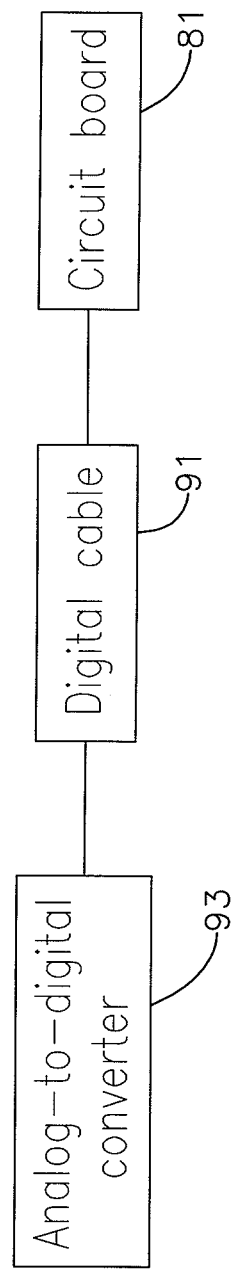
FIG. 11 is a function diagram of the electric device in FIG. 1.

With reference to FIGS. 1 and 10, the display unit 90 is mounted on a stem 140 of the bicycle, and is connected to peripheral devices of the bicycle by analog cables 92 such that the display unit 90 can display the information of the peripheral devices.

With reference to FIGS. 3, 5 and 6, the propulsion device as described has the following advantages. Because the normal of the circuit board 81 of the control unit 80 is parallel to the motor shaft 40, the rotor detecting segment 811 of the circuit board 81 is axially adjacent to the magnetic loop 511 of the rotor assembly 51, which allows the rotor detecting segment 811 to detect the magnetic pole of the magnetic loop 511. Therefore, the single circuit board 81 can detect the rotor assembly 51 as well as maintain electric connection with other components. As a result, the casing 10 can be reduced in volume to prevent interference with a rear wheel.

Because the pins 831 of the power switch device 83 are bent vertically, the switch body 832 is parallel to the circuit board 81 and does not protrude out of the circuit board too much. Additionally, the power switch devices 83 abut an inside surface of the casing 10 without any gap between the power switch devices 83 and the inside surface of the casing 10. As a result, the casing 10 can be further reduced in volume.

Because the heat-dissipating fins 111 are formed integratedly on an outside surface of the casing 10 and are disposed on the outside of the corresponding power switch device 83, the distance that the heat-dissipating fins 111 protrude out of the outside surface of the casing 10 can be shortened to further reduce the whole volume of the propulsion device.

With reference to FIGS. 5 to 7, the components of the propulsion device are closely disposed in the casing 10. The pedal shaft 20, the receiver 31, the sensor 32, the motor shaft 40, the rotor assembly 51 and the stator assembly 52 are mounted around each other in sequence. The circuit board 81, the capacitor 82, the middle gear 61 and the small gear 62 are all on the same side of the pedal shaft 20. The casing 10 can accommodate all the components mentioned above with a minimized volume.

Besides, because the components in the casing 10 are fewer in amount or are closely disposed, there is more space available to accommodate the rotor assembly 51 and stator assembly 52 with larger outer diameters to increase the output power.

On the other hand, as the components of the propulsion device are closely disposed in the casing 10, no exterior component needs to be mounted outside the casing 10, and accordingly the cables outside the casing 10 and components for installation such as screws are reduced or omitted as well. Thus, the propulsion device is more convenient to be installed on the bicycle frame 100. During repair or a maintenance check, the user only has to disassemble the propulsion device, which facilitates convenience in operation.

Because the components of the propulsion device are closely disposed in the casing 10, the casing 10 can effectively protect the components such as the receiver 31, the sensor 32 and cables connected to the control unit 80 from damage or interference in use.

With reference to FIGS. 1, 6, 10 and 11, with respect of the display unit 90, the analog-to-digital converter 93 can integrate all the analog cables 92 connected to the peripheral devices into the single digital cable 91. Thus, the display unit 90 and the control unit 80 are connected only by the single digital cable 91, which effectively lowers the number of the cables and avoids disorganization of cables.

With reference to FIGS. 1, 5 to 7, when the electric device as described is in use, the biker stamps on the pedals 130 to rotate the pedal shaft 20. Then, the pedal shaft 20 rotates the receiver 31, the one-way pedal clutch 65, the big gear 64 and the chain wheel 70 in sequence. The chain wheel 70 actuates the rear wheel via the roller chain.

When the control unit 80 actuates the motor, the stator assembly 52 is electrified and generates a magnetic field. The magnetic field rotates the rotor assembly 51 mounted in the stator assembly 52. Then, the rotor assembly 51 rotates the motor shaft 40, the middle gear 61, the one-way motor clutch 63, the small gear 62, the big gear 64 and the chain wheel 70 in sequence. The chain wheel 70 actuates the rear wheel via the roller chain.

According to the above technical features, the big gear 64 can be actuated either by the biker's pedaling or by the motor. When the rotation rate of the big gear 64 actuated by the biker's pedaling is higher than the rotation rate of the big gear 64 actuated by the motor, the one-way motor clutch 63 functions and prevents the big gear 64 with the small gear 62 from interfering with the middle gear 61 and with the rotor assembly 51 and the stator assembly 52.

In contrast, when the rotation rate of the big gear 64 actuated by the motor is higher than the rotation rate of the big gear 64 actuated by the biker's pedaling, the one-way pedal clutch 65 functions and prevents the big gear 64 from interfering with the pedal shaft 20 and the cranks 120.

As a result, when the rotation rate of the big gear 64 actuated by the motor is equal to the rotation rate of the big gear 64 actuated by the biker's pedaling, the force generated by the motor and the force generated by the biker are integrated to save strength and energy of the biker.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. An electric device for a bicycle comprising:
  a casing having an inner space;
  a pedal shaft mounted through the casing and having two ends protruding out of the casing;
  a motor shaft mounted pivotally in the casing, wherein the motor shaft has a gear formed annularly on an outside surface of the motor shaft;
  a rotor assembly mounted in the casing, connected to the motor shaft, and actuating the motor shaft;
  a stator assembly mounted securely in the casing and corresponding to the rotor assembly;
  a gear assembly mounted in the casing, connected to the pedal shaft and the motor shaft, and actuated by the pedal shaft or the motor shaft;
  a chain wheel connected to the gear assembly and actuated by the gear assembly, wherein the gear assembly includes:
    a one-way pedal clutch mounted between the pedal shaft and the chain wheel, wherein the chain wheel is actuated by the pedal shaft, but the pedal shaft is not actuated by the chain wheel;
a one-way motor clutch mounted between the motor shaft and the chain wheel, wherein the chain wheel is actuated by the motor shaft, but the motor shaft is not actuated by the chain wheel;
a middle gear mounted pivotally in the casing and engaging with the gear of the motor shaft;
a small gear connected securely and coaxially to the middle gear; and
a big gear mounted around the pedal shaft, engaging with the small gear and engaging with the chain wheel;
wherein the one-way motor clutch of the gear assembly is mounted between the middle gear and the small gear, wherein the small gear is actuated by the middle gear, but the middle gear is not actuated by the small gear;
wherein the one-way pedal clutch of the gear assembly is mounted between the pedal shaft and the big gear, wherein the big gear is actuated by the pedal shaft, but the pedal shaft is not actuated by the big gear; and
a control unit mounted securely in the casing, with the control unit having:
a circuit board electrically connected to the stator assembly and having:
a normal parallel to the motor shaft; and
a rotor detecting segment adjacent to the rotor assembly and detecting the rotor assembly; and
multiple power switch devices electrically connected to the circuit board.

2. The electric device as claimed in claim 1, wherein the motor shaft is mounted around the pedal shaft.

3. The electric device as claimed in claim 2, wherein each power switch device of the control unit has:
a switch body parallel to the circuit board; and
multiple pins connected to the switch body and the circuit board, and bent vertically.

4. The electric device as claimed in claim 3, wherein:
each power switch device of the control unit has a metal heat-dissipating surface abutting an inside surface of the casing; and
the casing has multiple heat-dissipating fins formed on an outside surface of the casing and disposed on an outside of the power switch devices.

5. The electric device as claimed in claim 4 further comprising a display unit, with the display unit having:
an analog-to-digital converter; and
a digital cable connected to the analog-to-digital converter and the circuit board of the control unit.

6. The electric device as claimed in claim 5, wherein:
the control unit has a capacitor mounted on the circuit board; and
the capacitor and the power switch devices are respectively disposed on two opposite surfaces of the circuit board.

7. The electric device as claimed in claim 6, wherein:
the rotor assembly is mounted securely around the motor shaft; and
the stator assembly is mounted around the rotor assembly.

8. The electric device as claimed in claim 7 further comprising:
a receiver mounted in the casing and connected securely to the pedal shaft; and
a sensor mounted securely in the casing, mounted around the pedal shaft, electrically connected to the circuit board of the control unit, and corresponding to the receiver.

9. The electric device as claimed in claim 8, wherein the sensor is mounted around the receiver.

10. The electric device as claimed in claim 9, wherein the motor shaft is mounted around the sensor.

11. The electric device as claimed in claim 10, wherein the one-way pedal clutch of the gear assembly is a ratchet, and the one-way motor clutch of the gear assembly is a one-way bearing.

12. The electric device as claimed in claim 1, wherein each power switch device of the control unit has:
a switch body parallel to the circuit board; and
multiple pins connected to the switch body and the circuit board, and bent vertically.

13. The electric device as claimed in claim 1, wherein:
each power switch device of the control unit has a metal heat-dissipating surface abutting an inside surface of the casing; and
the casing has multiple heat-dissipating fins formed on an outside surface of the casing and disposed on an outside of the power switch devices.

14. The electric device as claimed in claim 1 further comprising a display unit, with the display unit having:
an analog-to-digital converter; and
a digital cable connected to the analog-to-digital converter and the circuit board of the control unit.

15. The electric device as claimed in claim 1, wherein:
the control unit has a capacitor mounted on the circuit board; and
the capacitor and the power switch devices are respectively disposed on two opposite surfaces of the circuit board.

16. The electric device as claimed in claim 1, wherein:
the rotor assembly is mounted securely around the motor shaft; and
the stator assembly is mounted around the rotor assembly.

17. The electric device as claimed in claim 1 further comprising:
a receiver mounted in the casing and connected securely to the pedal shaft; and
a sensor mounted securely in the casing, mounted around the pedal shaft, electrically connected to the circuit board of the control unit, and corresponding to the receiver.

18. The electric device as claimed in claim 17, wherein the sensor is mounted around the receiver.

19. The electric device as claimed in claim 17, wherein the motor shaft is mounted around the sensor.

20. The electric device as claimed in claim 1, wherein the one-way pedal clutch of the gear assembly is a ratchet, and wherein the one-way motor clutch of the gear assembly is a one-way bearing.

* * * * *